United States Patent [19]
Plank et al.

[11] Patent Number: 5,978,566
[45] Date of Patent: Nov. 2, 1999

[54] CLIENT SIDE DEFERRED ACTIONS WITHIN MULTIPLE MAPI PROFILES

[75] Inventors: Darrell Alan Plank, Belleville; Ramesh Babu Pabbati; R. Scott Briggs, both of Redmond, all of Wash.

[73] Assignee: Microsoft Corporation, Redmond, Wash.

[21] Appl. No.: 08/679,129

[22] Filed: Jul. 12, 1996

[51] Int. Cl.⁶ .................................................. H01J 13/00
[52] U.S. Cl. ............................... 395/200.36; 395/200.33
[58] Field of Search ........................... 379/93.24, 100.08, 379/100.09; 395/200.32, 200.36, 200.37, 200.53, 200.57, 200.59, 200.73

[56] References Cited

U.S. PATENT DOCUMENTS

| | | | |
|---|---|---|---|
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,524,137 | 6/1996 | Rhee | 379/67 |
| 5,548,789 | 8/1996 | Nakanura | 395/200.36 |
| 5,555,346 | 9/1996 | Gross et al. | 395/51 |
| 5,557,659 | 9/1996 | Hyde-Thomson | 379/88 |
| 5,627,764 | 5/1997 | Schutzman et al. | 395/200.37 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Primary Examiner—Frank J. Asta
Assistant Examiner—Daniel C Patru
Attorney, Agent, or Firm—Workman Nydegger Seeley

[57] ABSTRACT

A user-defined rule that specifies a condition and an action to be performed is processed in an electronic messaging system that includes a server and a client by determining at the server whether the condition is satisfied upon an occurrence of an event. Once the condition is satisfied, the action is performed at the server if all resources for performing the action are resident on the server. If one or more of the resources for performing the action are resident on the client, a deferred action message representative of the action is generated. The deferred action message is processed by the client, either immediately if the client is presently logged in to the server, or later when the client next logs in to the server, and the action is performed at the client based on the deferred action message.

39 Claims, 7 Drawing Sheets

CLIENT SIDE DEFERRED ACTIONS WITHIN MULTIPLE MAPI PROFILES

BACKGROUND OF THE INVENTION

This invention relates to the handling of electronic mail ("e-mail") messages within an e-mail messaging system.

Figure 1:
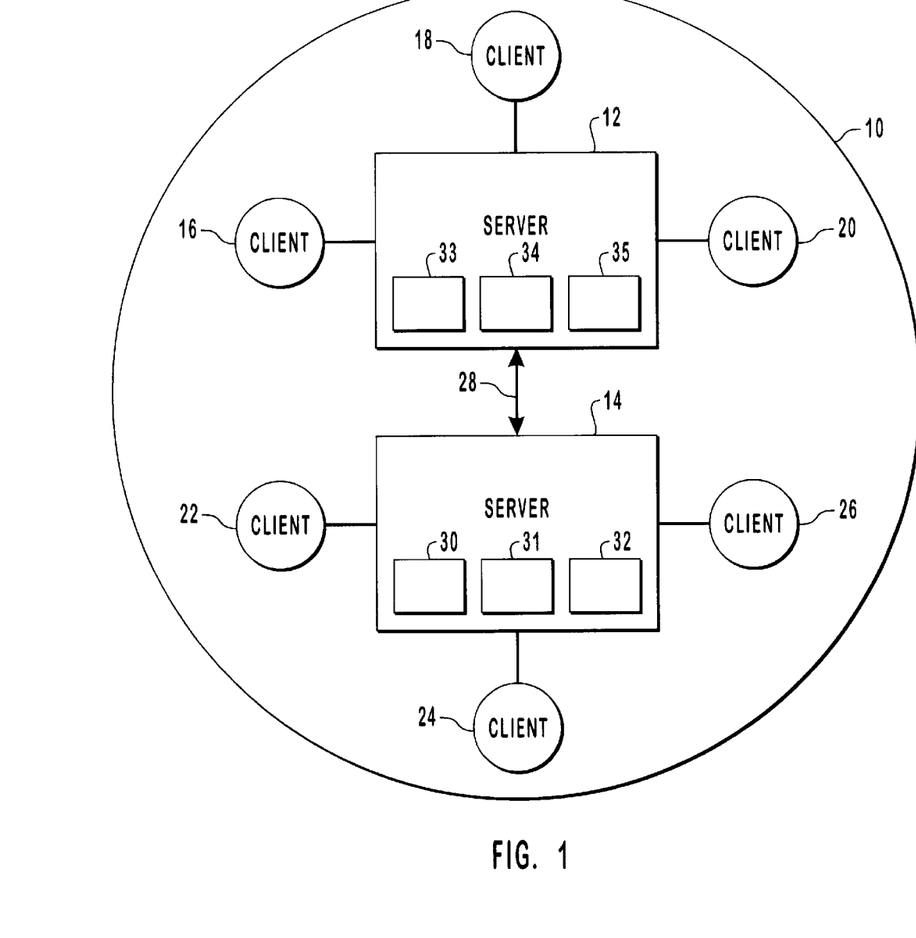
FIG. 1 is a logical block diagram showing an example configuration for a site in an e-mail system.

An e-mail messaging system generally is composed of one or more sites interconnected through a local area network ("LAN"). A typical e-mail site 10 as shown in FIG. 1 includes one or more servers 12 and 14 interconnected by a communications path 28. Each server 12 and 14 respectively serves one or more clients 16, 18, 20 and 22, 24, 26 (e.g., individual workstations). A client in turn interacts through a user interface application with an end-user—for example, a human operator who seeks to use the e-mail system to communicate with other end-users.

Figure 2:
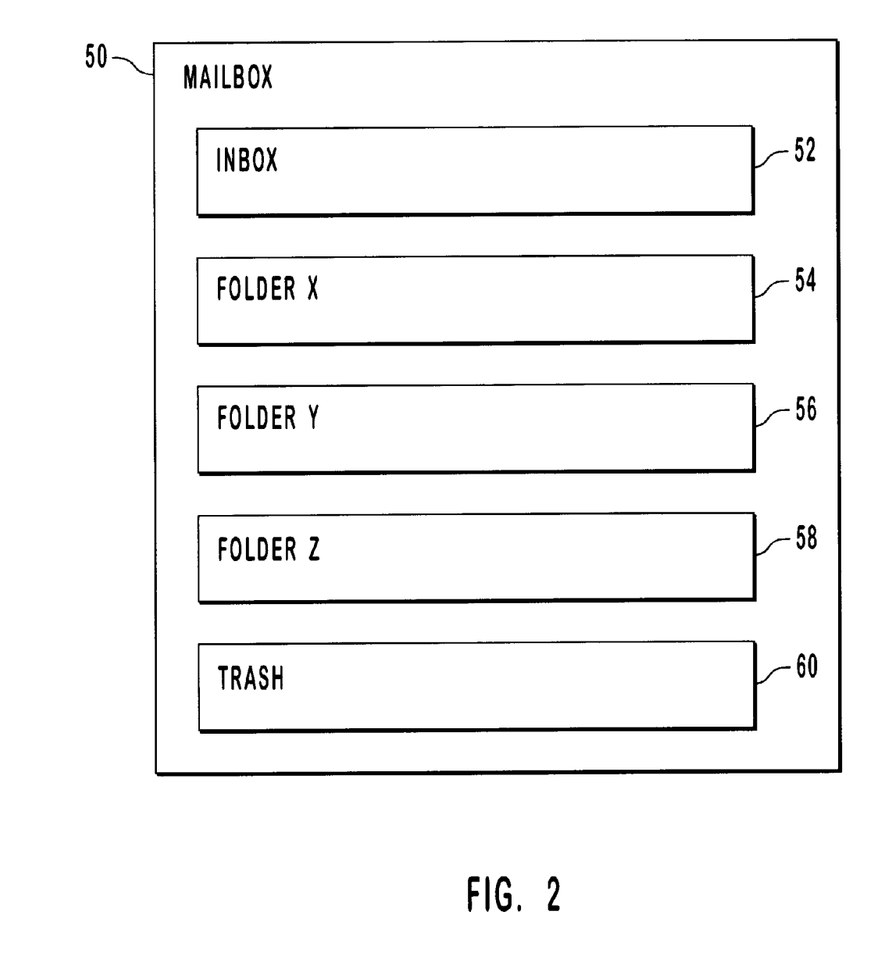
FIG. 2 is a data diagram of an end-user's mailbox present on a server in an e-mail system.

Each end-user of the e-mail system has a unique "mailbox" 30–35 located on one of the servers in the e-mail system through which the end-user sends, receives, stores or otherwise processes messages. A mailbox is an abstraction for an electronic workspace associated with a single, specific end-user. As shown in FIG. 2, a mailbox 50 may be subdivided logically into a number of constituent workspaces, for example, an in-box 52 in which some of newly received messages are placed; one or more user-specified folders 54, 56, 58 for organizing and storing e-mail messages by subject matter; a "trash" folder 60 in which unwanted messages are placed; and so on. Ordinarily, the various elements of an end-user's mailbox are graphically represented as various abstractions on the screen display of the client (e.g., icons of file folders, a trash bin).

An end-user may access his or her mailbox by logging on to the appropriate server through a client connected to that server. For example, the end-user who owns mailbox 31 in FIG. 1 may log on to server 14 through any one of clients 22, 24 or 26 to access his or her mailbox. Client 22 might be a desktop PC at the office while client 24 might be the same user's laptop computer. Once an end-user has gained access to his or her mailbox, he has a number of operations available including preparing and sending new messages; reading and replying to messages received from other end-users of the e-mail system; forwarding messages on to other end-users; deleting unwanted messages; organizing saved messages by moving or copying them into new or existing folders; and so on. In the simplest case, these operations are performed interactively (e.g., manually by the user); each operation requiring input from and/or acknowledgement by the end-user before its execution may be completed.

Often an end-user will want to perform the same operations on messages having the same characteristics (e.g., identity of the end-user who sent the message, subject matter of message, priority assigned to message, etc.). An agent known as a "rule" allows the end-user to specify one or more "actions" that will be performed by the e-mail system automatically during message delivery phase, based upon one or more triggering conditions being satisfied. For example, an end-user may create a rule that all incoming messages on a specified topic (the condition) are to be forwarded (the action) to another end-user. In another example, the end-user may want to be notified whenever a new "urgent priority" message (first condition) is received from his or her boss (second condition) by having a pop-up alert window displayed (first action) and a tone generated (second action) at the client through which the end-user is logged on to the server.

Rules are created by the client on a client by an end-user using an appropriate rule building tool (e.g., dialogue boxes with menus of conditions and actions built into the e-mail messaging system). An end-user may create new rules, edit existing rules, change the order in which rules are to be evaluated or delete unwanted rules according to personal requirements and preferences. Once a rule has been created by the client it is communicated to and stored on the server in association with the end-user's mailbox.

Whenever a messaging "event" occurs for a particular end-user, the server associated with that end-user evaluates the end-user's present collection of rules to determine if the conditions of one or more of the rules have been met. Ordinarily, an event is the receipt of a new message but it also could be the sending of a message. If the event satisfies the conditions of a rule, the server performs the actions associated with that rule. Rule based messaging systems are described in more detail in U.S. Pat. No. 5,238,856 (Gross et al.), issued Feb. 1, 1994, which is incorporated by reference.

What is needed are tools and techniques that allow automated rules for handling e-mail messages in a server-based system to be processed in a seamless and efficient manner over multiple client types for a given user.

SUMMARY OF THE INVENTION

In one aspect of the invention, in a server based electronic messaging system with user-definable rules, the actions specified in triggered rules whose conditions are satisfied are executed either on the server or the client depending on the type of action. The action is performed at the server if all resources for performing the action are resident on the server. If one or more of the resources for performing the action are resident on the client, a deferred action message describing the actions to be executed by the client is generated and placed in a dedicated storage location on the server. The deferred action message is processed by the client either immediately following its creation and storage if the client is logged in to the server at that time or when the client next logs in to the server. The action may be performed at the client based on the content of the deferred action message.

In a typical situation, a number of deferred action messages may accumulate while the client is not logged in to the server. In that case, the client treats the accumulated deferred action messages as a queue by reading, processing, and deleting them in the order that they were generated by the server. While the client is logged in to the server, the deferred action messages will not accumulate, but rather will be read, processed and deleted essentially immediately after they are generated and placed in the dedicated storage area on the server.

The rule which is processed by the electronic messaging system may include a plurality of actions to be performed—one set of actions which is performed at the server, and another set of actions which is used as a basis for generating the deferred action message. The deferred action message may include information to compensate for a change in location caused by performing the set of actions at the server.

In another aspect of the invention, a field of the deferred action message is compared with a property of the client when the client logs in to the server. This property for example may be the identity of the specific rule provider or MAPI (messaging application program interface) profile under which the rule was created. In any case, only if the field of the deferred action message matches the property of the client may the deferred action message be processed by the client.

On the other hand, if the field of the deferred action message does not match the property of the client, the age of the deferred action message is determined by comparing the deferred action message creation date field against the current date. If the age of the deferred action message exceeds a threshold value, 60 days in one embodiment, then a predetermined operation such as disabling the rule or deleting the deferred action message may be performed.

This client may be designed to differentiate between multiple clients associated with the same user. The deferred action message includes a field that identifies a unique messaging environment, for example a MAPI profile, on one of the plurality of clients. This field may correspond to identifying information included in the rule—for example, a global unique identifier. If all of the resources necessary for performing the rule's action are available to the server, the rule will not have any profile-specific identifying information added.

When one of the plurality of clients logs in to the server, the field of the deferred action message is compared with the unique messaging environment of the client. If the field of the deferred action message matches the unique messaging environment of the client, the deferred action message is available to be processed by the client which performs the actions specified therein.

The rule stored in association with the end-user's mailbox may specify multiple actions, some of which can be performed at the server and others which cannot because the necessary resources are not resident on the server. In that case, a single deferred action message may include several deferred actions.

In some cases, the actions specified by a rule may be order-dependent—that is, the execution of one action in the rule may affect the execution of another action in the rule. If the server executes one or more of the order-dependent actions out of turn, unintended and incorrect results may occur when the actions in the deferred action message subsequently are performed at the client. In that case, a message pointer included in the deferred action message is modified to reflect the characteristics of the end-user's mailbox after the actions have been performed on the server. This allows the client to perform the actions in the deferred action message in the correct manner.

A deferred action message may include its date of creation which may be used, for example, to delete any deferred action messages that are older than a predetermined age or to disable the corresponding rule.

Advantages of the invention may include one and/or more of the following: The techniques described here prevent servers in an e-mail system from wasting system resources with an accumulation of dormant deferred action messages. Even if a client is not logged in, a server may process a rule nevertheless by performing all of the server-side options, creating a deferred action message for the client-side actions, and storing it in the end-user's mailbox.

Deferred action messages that have sat around unprocessed by any rule provider or MAPI provider for too long will be disposed of, thus further reducing the accumulation of unnecessary data and objects in the e-mail system. Moreover, the rule that created the stale deferred action message will be disabled so that its execution will not generate any more deferred action messages that went stale.

The present invention provides a clear delineation between server-side actions and client-side actions which enhances the functionality of the e-mail system. Depending on the nature of the actions to be taken when a particular rule is triggered, the server may be able to perform the actions as soon as it determines that the triggering conditions are satisfied. For actions that refer only to objects and data on the server, when the triggering condition is met (e.g., a message on a specified topic is received in end-user's mailbox), the server can perform the associated action (e.g., forwarding the message to another end-user) immediately, even if the end-user is not logged on to the server, because the action to be performed requires no resources resident on the client. Because each end-user's mailbox is, by design, located on a server, the server may simply move the message from end-user's mailbox folder to another as the message is received. In other words, no resources resident on client are necessary because all of the objects and data needed to perform the action are present on the server.

In contrast, actions that require resources or data not located at the server (e.g., displaying an alert window and generating a tone on the client) necessarily require interaction with the client. These actions consequently may not be performed unless and until the end-user logs on to the server, at which point the server notifies the client to perform the appropriate actions. As a result, several triggered but unprocessed rules may accumulate and sit dormant on the server until the associated end-user logs on to the server. Such an accumulation of unprocessed deferred action messages increases the storage utilization by the server. As soon as the deferred action message is created and stored, the rule is effectively fully processed from the server's point of view, and the server may proceed with its other tasks including evaluation of next rule on the mailbox.

The use of a unique identifier in a deferred action message to identify the client environment under which it was created allows the end-user to create and use rules on several different clients (e.g., desktop, laptop via modem, etc.) without fear that incorrect actions will be taken, and without restricting the set of permissible actions to the lowest common denominator of capabilities across all of the user's MAPI profiles or clients. The unique identifier on the deferred action message prevents a client from processing a deferred action message unless the client is operating in the environment under which the rule that precipitated the deferred action message was created.

Stamping the rule with a unique identifier from the client environment allows a rule provider to distinguish different client environments.

Other advantages and features will become apparent from the following description, including the drawings and claims.

DESCRIPTION OF THE PREFERRED EMBODIMENTS

Table I below identifies eight potential actions that may be performed by an e-mail system when a user-defined rule has been triggered (i.e., when the rule's conditions have been met). These actions are forward, reply, bounce, delete, move, copy, alert and custom. Table I specifies for each action whether it is capable of being executed exclusively at the server or whether execution of the action requires interaction with the client.

TABLE I

| Action | Execution Locus |
| --- | --- |
| Forward | Server |
| Reply | Server |
| Bounce | Server |
| Delete | Server |
| Move | Server if destination is on server, otherwise client |
| Copy | Server if destination is on server, otherwise client |
| Alert | Client |
| Custom | Client |

A forward action automatically submits a copy of a designated message from the end-user's mailbox into another end-user's mailbox. Because mailboxes are resident on a server, a forward action may be executed without any interaction with the client—the forwarded message is delivered to other mailboxes on the same or different server.

A reply action generates a new message containing user pre-defined text (referred to as a "reply template") addressed to the author of the message that prompted the reply. The end-user for whom the reply was generated may edit the message text and specify other recipients for the reply. The resulting message is then mailed to another end-user's mailbox, which as noted above, is resident on a server. Consequently, no client interaction is needed for a reply action.

A bounce action simply returns a message to its author as an undeliverable message. In effect, a bounced message is never delivered to the bouncing end-user's mailbox and returned to the author's mailbox, both of which are resident on the same or different server, thus requiring no client interaction.

As its name suggests, a delete action removes a message from an end-user's mailbox, and thus requires no interaction with a client.

The four actions discussed above—forward, reply, bounce and delete—are capable of being executed exclusively at the server because all of the resources (e.g., objects and data) that they reference are resident at the server. Consequently, a server may fully execute any of these four actions without waiting for the end-user to log in to the server via a client, thus making the resources of the client available.

In contrast, the move and copy actions may or may not be executed at the server depending on the circumstances. A move action relocates a message from one location (the "source" location) on an electronic medium (e.g., random access memory, hard disk) to another location (the "destination" location) on the same or a different electronic medium. A copy action performs essentially the same operation as a move operation except that a copy action leaves a duplicate of the message in the source location and in the destination location.

For either the move or copy actions, if both the source and destination locations are located on a server, a move/copy action may be executed exclusively at the server. On the other hand, if the destination location is located on a client (referred to as a "foreign message store"), a move/copy action necessarily requires interaction with the client in order for the message to be move or copy from the server to the client. For example, an end-user could create a rule that all messages received in his or her mailbox on the server are to be moved to a private storage area ("PST") on a client. In that case, the server could not execute the move operation unless and until the client was logged in to the server, at which point the received messages could be moved to the PST.

The remaining two actions—alert and custom—always must be executed at the client. An alert action informs the end-user through text or sound or a combination of both that the conditions of a rule have been met. Typically, an alert action generates a tone and a pop-up window on the display screen of the client with a message (for example, "MESSAGE RECEIVED FROM YOUR BOSS") specified by the end-user who created the rule. Because the pop-up window and tone must be generated locally on the client for the end-user to be able to see and hear them, an alert action cannot be performed at the server, but rather requires the client to be logged in for the end-user to see these alert mechanisms.

A custom action is a fully extensible hook that allows an end-user to specify a special purpose action. Typically, the special purpose action is embodied as an executable object located on the client which is to be launched when the conditions of the associated rule are met. Because the executable object is located on the client, the server cannot execute a custom action on its own; rather, it must wait until the client is logged in at which point the server instructs the client to launch the executable object.

With respect to the move, copy, alert and custom actions, a situation may frequently arise in which a triggered rule specifies one or more actions that require resources on the client, and thus cannot be fully processed at the server. In those situations, the server first performs all of the "server-side" actions specified by the rule—that is, the actions which do not require client resources and which may be performed exclusively at the server. For the remaining "client-side" actions—those actions specified by a triggered rule that require client interaction—the server generates a deferred action message ("DAM"), a mechanism by which the server may communicate one or more actions that are to be performed by the client.

A DAM is embodied as a message which, when created, is stored in the corresponding end-user's mailbox in a special-purpose folder (a deferred actions folder or "DAF," not shown in FIG. 2) that is hidden from the end-user's view; neither the DAF nor any DAMs which it may contain appear on the client's screen display. A DAM remains in the DAF on the server until it is read and processed by a client, at which point the DAM is deleted from the DAF. This happens either immediately following DAM creation if the corresponding end-user happens to be logged in to the server, or after an indefinite period of delay when the end-user subsequently logs in to the server seeking to access his or her mailbox. In either case, the client checks for the presence of DAMs in the DAF, and finding one or more present, may process the DAMs by locally performing the actions specified therein.

In a typical scenario, a client logging in to a server might find that a number of DAMs have accumulated in the DAF since the last login. Each of these DAMs would have been generated and placed in the DAF in serial fashion. The client treats such an accumulation of DAMs as a queue: the first DAM in the DAF (i.e., the oldest DAM) is read, processed (e.g., the DAM is ignored, the actions specified therein are executed at the client), and then deleted from the DAF if appropriate. Next, the second oldest DAM is read, processed, deleted and so on until all of the DAMs in the DAF have been disposed of.

One factor complicating this scheme is that a single end-user may log in to a server through two or more different clients, either concurrently or, more commonly, at different times. For example, a single end-user may log in to the server from the office using a workstation (first client) and/or from home using a laptop computer (second client). Each separate client login provides independent access to the end-user's mailbox.

The characteristics of each separate client login will be determined by the particular MAPI (messaging application program interface) profile under which the end-user is operating. A MAPI profile defines the e-mail environment under which a particular client operates. To account for varying client configurations, an end-user employing a laptop-client to log in to an e-mail server likely will use a different MAPI profile, and thus a different environment, than when that same end-user uses a workstation-client to log in to the server. For example, the workstation-client is likely to have a permanent connection to any network whereas a laptop-client, being portable in nature, most likely will not be connected to any network except when the end-user plugs the laptop into a communications medium (e.g., telephone line). Accordingly, the laptop-client's profile should take that fact into consideration, for example, by allowing the transmission of messages from the laptop-client only when it is connected to a communications medium.

Figure 3:
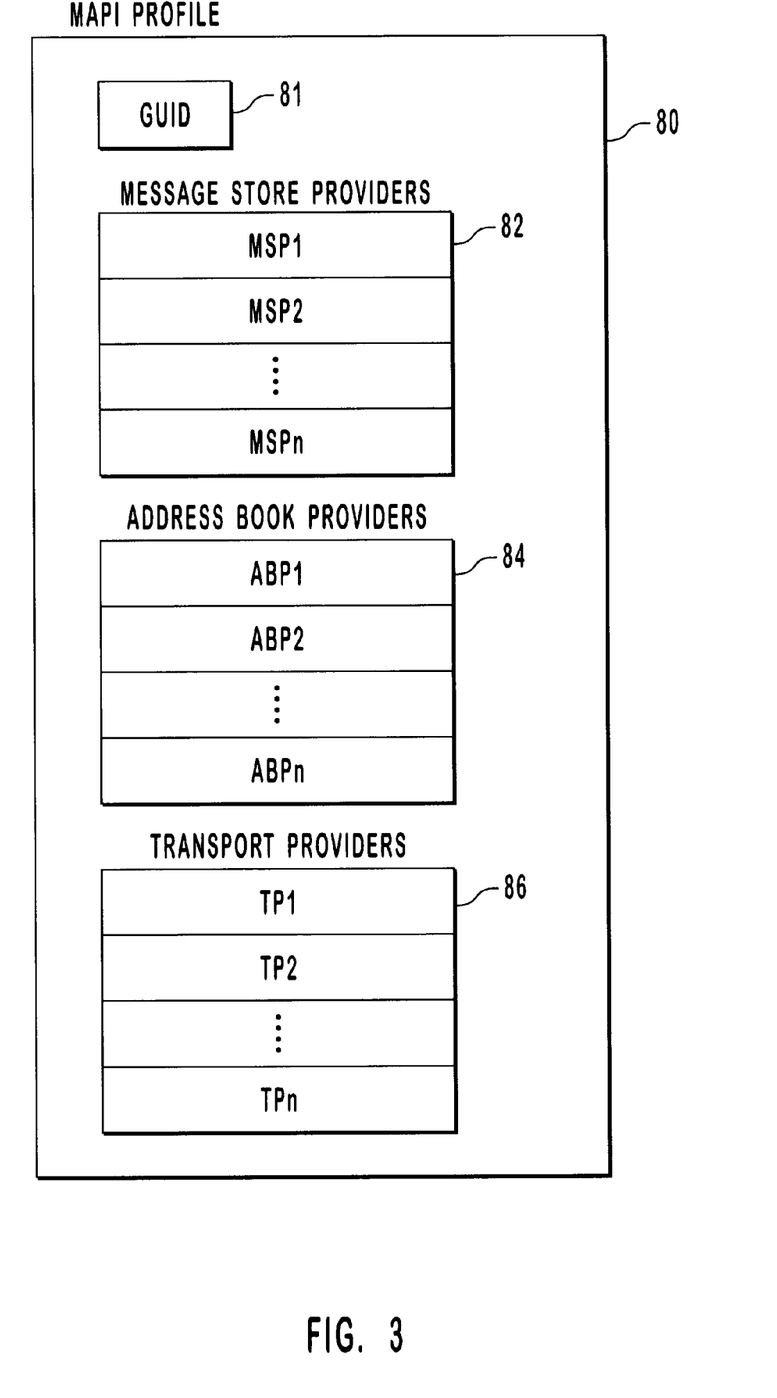
FIG. 3 is a data diagram for a messaging application programming interface profile present on a client in an e-mail system.

As shown in FIG. 3, a MAPI profile 80 includes lists of "providers," or resources available to an end-user on the specific client that is being used to log in to the server. For each provider listed, the e-mail system has a known API (application programming interface) that allows the e-mail system to exchange information with that provider. Examples of providers are "message store providers" 82 which are storage areas for messages on a client or a server; "address book providers" 84 which are collections of e-mail addresses for end-users reachable by the e-mail system; and "transport providers" 86 which are mechanisms for transporting information to and from the message store.

An end-user may create rules using a "rule provider," which is a program that provides an interactive user-interface with various user-interface abstractions to facilitate viewing, creating, modifying or deleting rules. A rule provider also typically includes a rule processing agent, which is the entity responsible for performing the actions specified in DAMs. A single client can have several different rule providers available—each one potentially providing variations in the manner in which a client-side action is performed.

Each MAPI profile 80 is regarded as unique and thus is assigned a corresponding GUID (global unique identifier) 81 by which it may be identified. A GUID is a 16 byte array of ASCII encoded hexadecimal characters.

When an end-user invokes a rule provider to create or modify a rule, the rule so created or modified is by definition specific to the rule provider under which it was generated because respective rule providers may perform a single action in different manners. In addition, a rule may be specific to the context of the MAPI profile under which it was created depending on the actions specified by the rule. Examples of such actions, referred to as "profile-specific actions," are moving or copying messages to a foreign message store, and alerting an end-user with text or sound or both.

Figure 4:
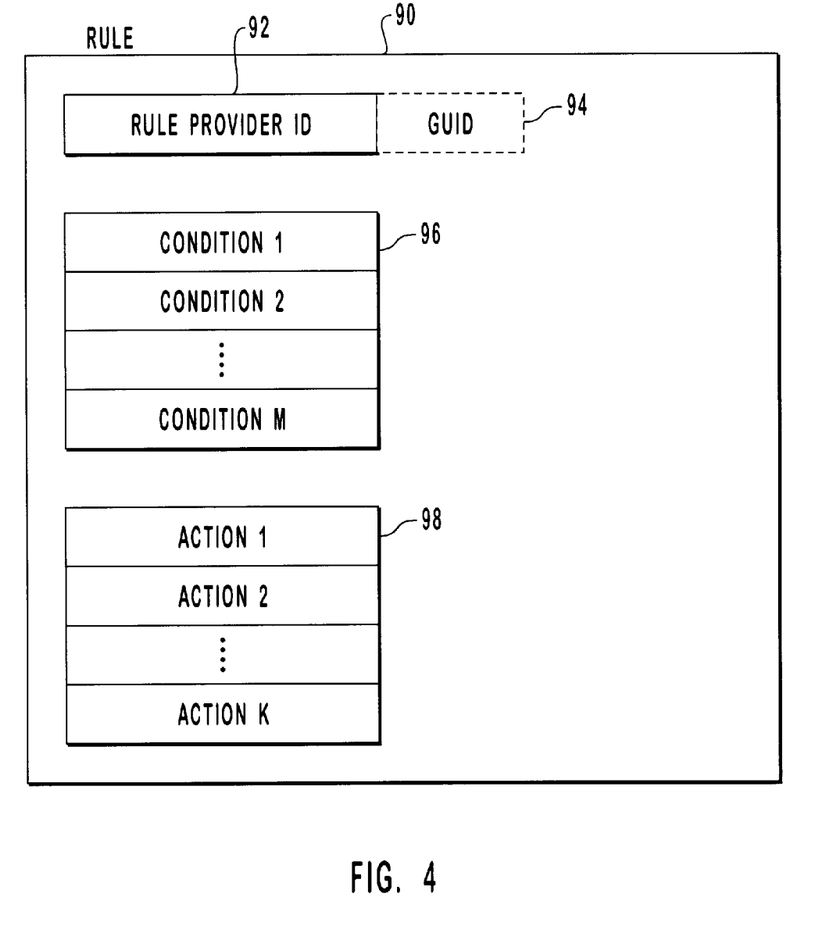
FIG. 4 is a data diagram of a rule created on a client and stored on a server in an e-mail system.

A rule 90 as shown in FIG. 4 contains a conditions field 96 which lists one or more conditions that, when satisfied, cause the rule to trigger. The actions field 98 specifies one or more actions that are to be performed when the rule is triggered. Each rule 90 also contains a rule provider ID field 92 which identifies the specific rule provider under which the rule was created. Whenever a new rule is created by an end-user, the actions specified in the actions field 98 are checked to see if one or more of them is a profile-specific rule. If so, the GUID for the particular MAPI profile under which the rule was created is stored in the GUID field 94 and thereby appended to the rule provider ID field 92. The GUID field 94 is not included in rules which do not require client resources.

The use of the GUID field 94 provides several advantages. For example, the GUID field may be used by a rule provider on any client to determine (i) whether a rule is non-profile-specific (no GUID present) and thus may be modified by the end-user under any MAPI profile, or (ii) whether a rule is profile-specific (GUID present), and thus may not be modified by the end-user except under the particular MAPI profile under which it was created. In the latter case, all rule providers other than the one through which the profile-specific rule was created would "grey out" the rule in the user interface (i.e., display the rule's name in subdued fashion) and disable it from being selected for modification.

Once the end-user has completed creating or modifying a rule, it is transmitted to the server and stored in association with the mailbox for the end-user who created the rule. Each end-user may have any number of rules associated with his or her mailbox. The server will evaluate each of the rules whenever a messaging event for the corresponding end-user occurs.

Figure 5:
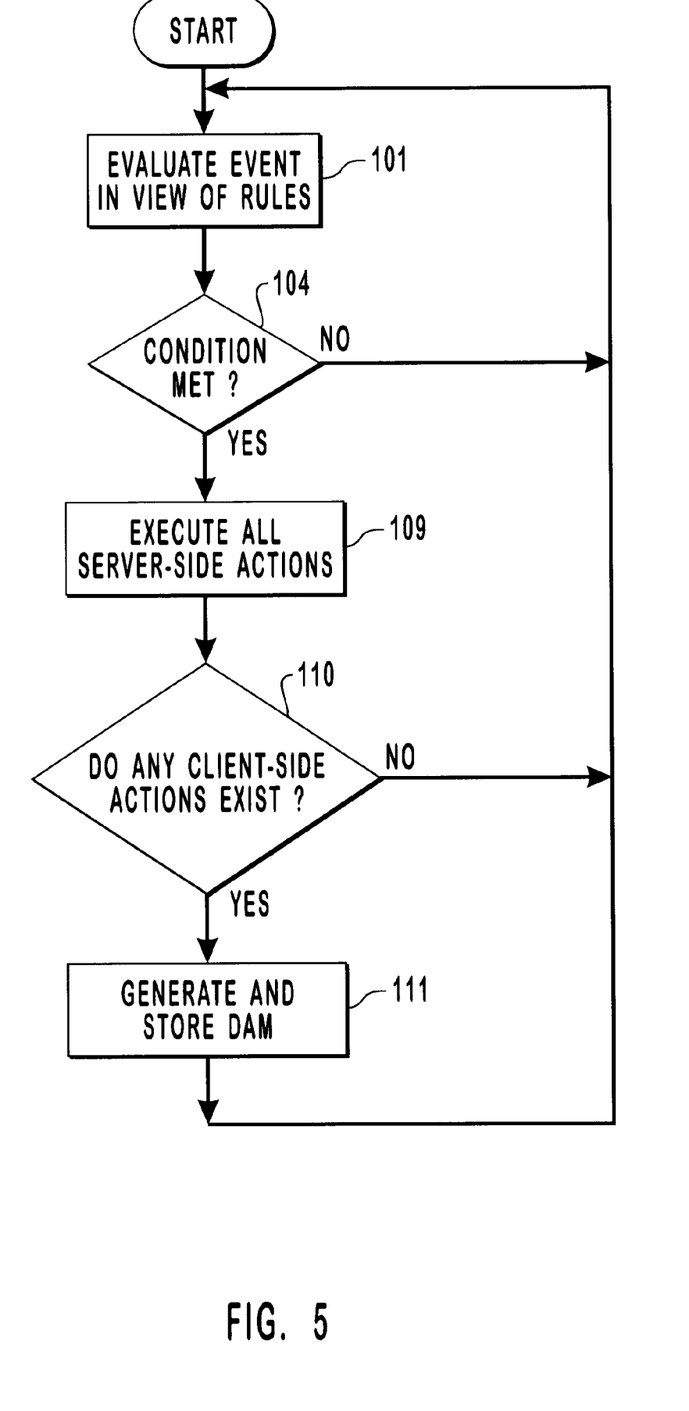
FIG. 5 is a flowchart of evaluating and processing rules upon an occurrence of an event in an e-mail system.

FIG. 5 is a flowchart of the logical steps that are performed at the server-side independent of the client in evaluating and processing rules. At step 101, once an event has occurred (e.g., a particular end-user's mailbox receives a new message from another end-user), the server compares the event against each of the stored rules for that end-user to see if the specified conditions of one or more rules have been satisfied (e.g., matching subject).

If the server determines at step 104 that the conditions for a rule have been met, all of the server-side actions specified in the triggered rule are executed at step 109. Otherwise, control returns to step 101 to wait for the next event.

At step 110, it is determined whether the triggered rule specifies any client-side actions. If the answer is no, it means that the triggered rule has been fully executed at the server side and control returns to step 101 to await the next event.

If, however, it is determined at step 110 that the triggered rule includes one or more client-side actions, the server generates a DAM representative of the yet unexecuted client-side actions and stores the DAM in the DAF of the mailbox for the corresponding end-user in step 111. In creating the DAM, the server must take care to account for any order-dependent actions that could change the location of message out of turn because the server-side actions were performed first. This is accomplished by including in the DAM a pointer to the current location of the message under consideration to reflect the correct location of the message after the server-side actions have been performed.

For example, if the actions specified by a triggered rule included "perform custom action on message X" and "move message X to folder A in the server mailbox," in that order, the server would nevertheless execute the move action first (because it is a server-side action) and would generate a DAM for the custom action (because it is a client-side action). Accordingly, the DAM must include a pointer to the present location of message X on the server (in folder A rather than in the end-user's in-box) so that the client will know where to find message X when it later seeks to perform a custom action on the message. If the location information in the DAM were not corrected, the client would expect to find message X in the in-box rather than in folder A.

After the server has created a DAM in step 111, control then passes back to step 101 to wait for the next event to occur.

Figure 6:
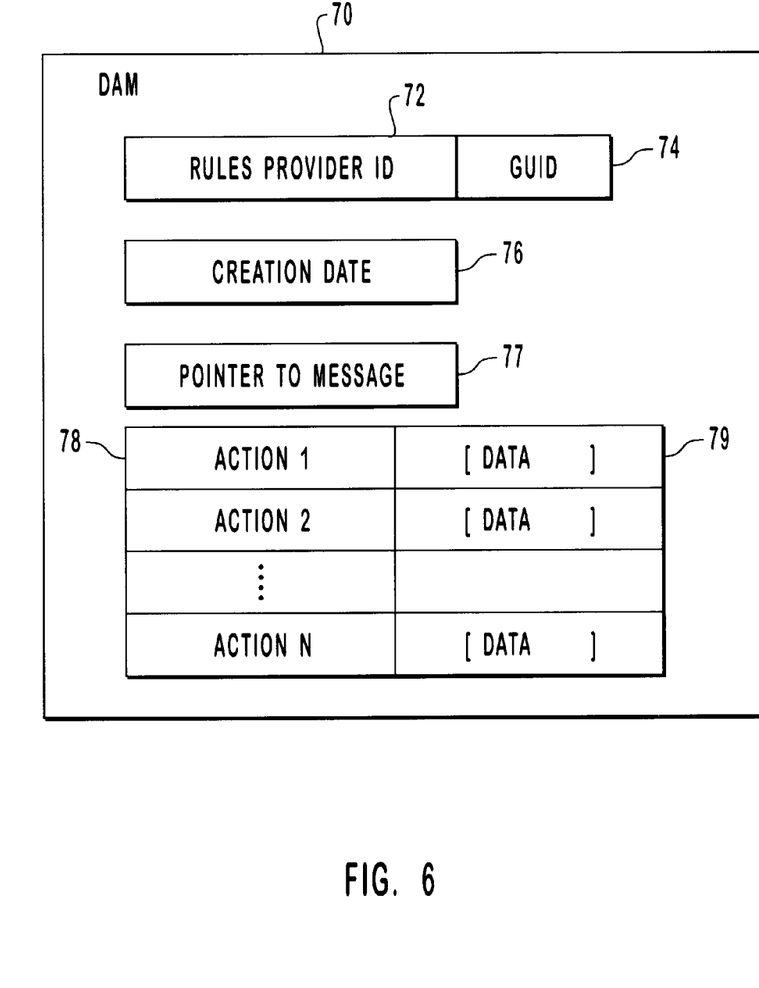
FIG. 6 is a data diagram of a deferred action message created as a result of the evaluating and processing of FIG. 5.

FIG. 6 is a logical representation of a DAM as it would be created by the server in step 111. Each fired rule with profile-specific action(s) gives rise to another DAM of the type shown in FIG. 6. Thus, if several rules fired on an event and had profile-specific actions prompted by met conditions, several such DAMs would be created and stored in the DAF in the order they were created. The DAM 70 contains a Rule Provider ID field 72 and a GUID field 74 which respectively contain the identity of the rule provider and the GUID for the MAPI profile under which the triggered rule was created. Pointer to the message on server whose delivery triggered the rule, this pointer is used by client to locate the delivered message when performing the action in DAM.

The primary component of DAM 70 is an actions field 78 which lists the actions (for example, Action 1, Action 2, ..., Action n, where n is a positive integer) that the client is to perform in order to complete the processing of a triggered rule. The actions field 78 includes a data field 79 which contains any data that needs to be received by the client from the server in order to execute a particular action. For example, if an alert action is included in actions field 78, data field 79 will contain information (e.g., alert text, tone signal) that allows the client to construct the proper alert sequence to notify the end-user.

A message pointer field 77 in DAM 70 holds a pointer to the message against which the rule criteria fired. If the action to be performed at the client is, for example, a move or copy action, message pointer field 77 will contain a pointer to the e-mail message whose receipt triggered the rule so that the client may retrieve and store the message in local storage as appropriate.

DAM 70 also contains a date field 76 which contains the day and time on which the DAM was created. This allows the client (or more specifically, the rule provider) to determine the presence of stale DAMs—those that have remained in the DAF for longer than a pre-defined period of time—so that they may be deleted. The elimination of stale DAMs helps prevents the e-mail system from becoming clogged with unused data and objects.

Figure 7:
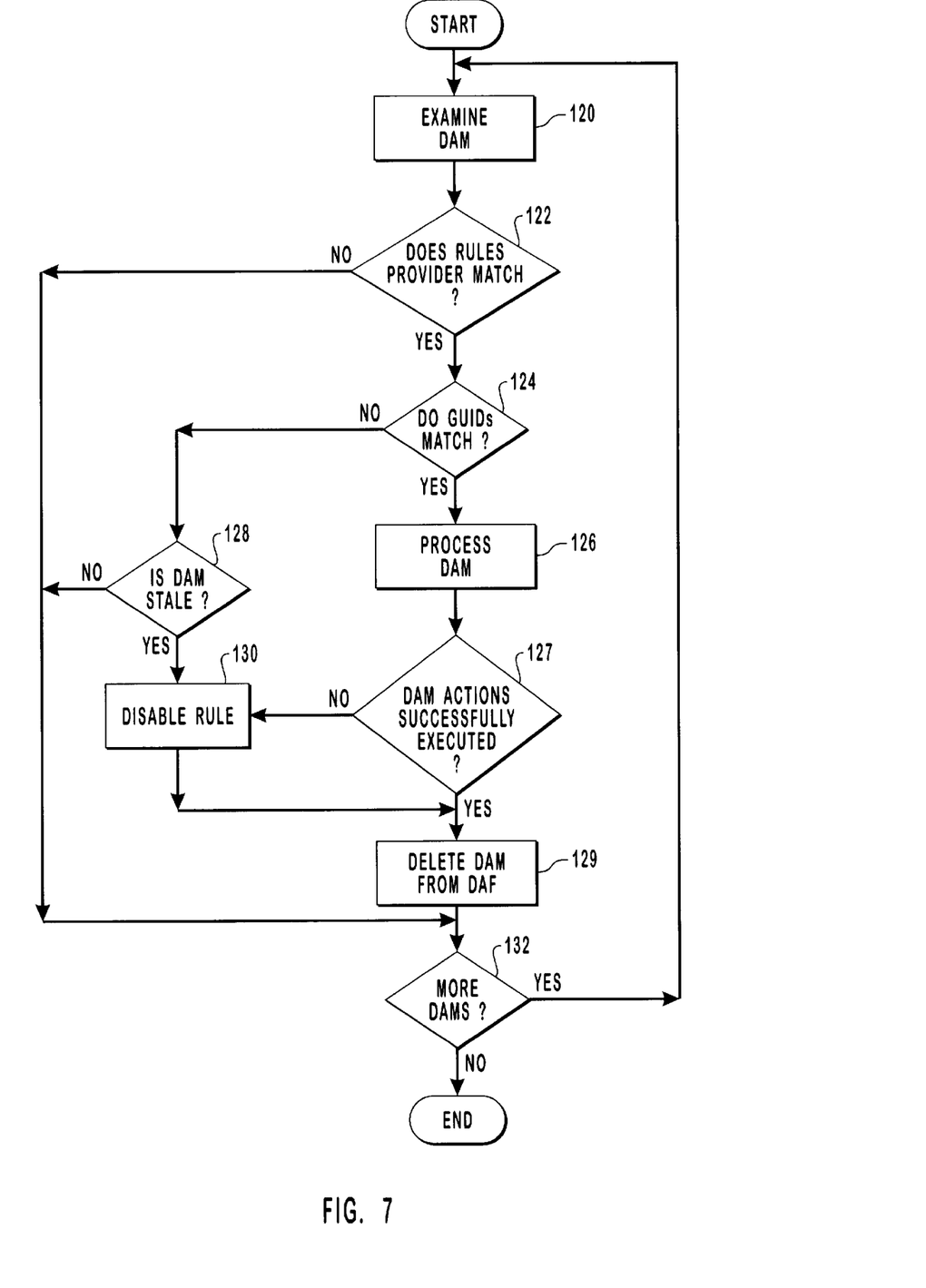
FIG. 7 is a flowchart of processing the deferred action message of FIG. 6.

FIG. 7 is a flowchart of client-side operations after a DAM has been generated and stored in an end-user's DAF and after the associated end-user has logged in to the server through a client. At step 120, the first DAM in the DAF is examined. If it is determined at step 122 that the DAM's rule provider ID specifies the particular rule provider for the client that is presently logged in to the server and which is seeking to execute the DAM, control passes to step 124. Otherwise, control passes to step 132 to determine if any more DAMs are present in the DAF. If yes, control returns to step 120 to evaluate the next DAM in the DAF. Otherwise, the DAMs processing sequence terminates, and DAMs are processed as they are generated by the server and appear in the DAF.

Step 122 ensures that the actions specified in a DAM are executed on the client-side only by the specific rule provider that created the rule. Otherwise, client may not have the required resources to perform the action.

At step 124, the rule provider on the client determines whether the DAM's GUID field matches that of the client under consideration to ensure that actions are not executed under the wrong MAPI profile. If it does match, it means that the client presently logged in has the same MAPI profile as that under which the triggered rule was created. Accordingly, control passes to step 126 at which the DAM is processed by the client.

At step 127 it is determined whether the actions specified in the DAM have been executed successfully at the client. If no, control passes to step 130 and the rule that precipitated the DAM under consideration is disabled by marking it "in error," meaning that that rule has created a DAM that contains one or more actions that cannot be successfully performed by the client (e.g., attempting to move a message to a folder that has been deleted). In any event, the DAM is deleted from the DAF in step 129 and control passes to step 132 to determine if any more DAMs are present in the DAF. If yes, control returns to step 120 to evaluate the next DAM in the DAF. Otherwise, the DAMs processing sequence terminates. The rule provider then begins to process DAMs as they are generated by the server.

If at step 124 it was determined that the GUIDs do not match, and thus that the DAM actions should not be executed by the client under consideration, the rule provider checks in step 128 to see if the DAM is stale. This step reads the creation date field in the DAM to determine how long the DAM has been sitting unprocessed in the DAF. If the DAM is older than a carefully chosen threshold value—for example, 30–90 days, preferably 60 days—the rule provider assumes that the profile under which the rule that precipitated this DAM was created is not in use or deleted. In that case, the rule provider in step 130 disables, but does not delete, the rule that spawned the DAM, and the stale DAM is deleted from the DAF in step 129. Steps 128–130 ensure that DAMs corresponding to a MAPI profile no longer in use do not sit in the DAF indefinitely and clog up the system.

Control then passes to step 132 to determine if any more DAMs are present in the DAF. If yes, control returns to step 120 to evaluate the next DAM in the DAF. Otherwise, the DAMs processing sequence terminates, and DAMs are processed as they are generated by the server and appear in the DAF.

A header file for the embodiment described above, EDKMDB.H, is attached as an Appendix. Among other things, this header file defines (for example, starting at the comment field "/* Rules specifics */") the specific properties of rules and actions in the messaging system.

The techniques described above are not limited to conventional e-mail systems but rather may find applicability in any network that transmits information between different nodes, or locations in a way which is amenable to use of the deferred action messages. Moreover, the techniques described above may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. In a messaging system comprising a server and a client and where a mailbox of a user resides on the server and is accessed by the user through the client, a method of using both the server and the client to process a user-defined rule that specifics at least one condition and at least one action to be performed when the at least one condition is satisfied, the method comprising the steps of:

defining, by the user, a rule having at least one condition that must be satisfied and at least one action that is to be performed by the client when said at least one condition is satisfied;

upon an occurrence of a rule-triggering event, determining at the server whether said at least one condition is satisfied; and if said at least one condition is satisfied then performing said at least one action by executing at least the steps of:

identifying, by the server, any actions defined by said rule that can be performed by the server and performing, by the server, said identified actions;

creating, by the server, a deferred action message comprising said at least one action of said rule that is to be performed by the client; and when the user accesses the mailbox on the server, then reading, by the client, said deferred action message and performing said at least one action.

2. The method of claim 1 further comprising:

placing the deferred action message in a storage location on the server;

processing the deferred action message by the client if the client is logged in to the server; and holding the deferred action message in the storage location if the client is not logged in to the server.

3. The method of claim 2 in which the deferred action message is not processed.

4. The method of claim 2 in which the processing comprises performing the at least one action specified in the deferred action message.

5. The method of claim 2 in which, while the client is not logged in to the server, a plurality of rule-triggering events cause a plurality of deferred action messages to be generated and placed in the storage location on the server.

6. The method of claim 5 in which the plurality of deferred action messages are processed by the client in the order they were generated when the client logs in to the server.

7. The method of claim 1 in which a plurality of rule-triggering events cause a plurality of deferred action messages to be generated.

8. The method of claim 1 in which the rule includes a plurality of actions to be performed, a first subset of actions is performed at the server, and a second subset of actions is used as a basis for generating the deferred action message.

9. The method of claim 8 in which the deferred action message includes information to compensate for a change in characteristics caused by performing the first subset of actions at the server.

10. The method of claim 1 further comprising:

comparing a field of the deferred action message with a property of the user's current client; and processing the deferred action message by the client if the field of the deferred action message matches the property of the client.

11. The method of claim 10 further comprising:

if the field of the deferred action message does not match the property of the client, determining an age of the deferred action message; and performing a predetermined operation if the age of the deferred action message exceeds a threshold value.

12. The method of claim 11 in which the predetermined operation comprises deleting the deferred action message.

13. The method of claim 11 in which the predetermined operation comprises disabling the rule.

14. The method of claim 10 in which the property of the client comprises an identity of a rule provider.

15. The method of claim 10 in which the property of the client comprises an identity of a messaging application programming interface profile.

16. In a messaging system comprising a server and a plurality of clients, each of which have a unique messaging environment, and where a mailbox of a user resides on the server and is accessed by the user through one of the plurality of clients, a method of using both the server and at one of the plurality of clients to process a user-defined rule that specifies at least one condition and at least one action to be performed when the at least one condition is satisfied, the method comprising the steps of:

defining by the user, a rule having at least one condition that must be satisfied and at least one action that is to be preformed by one of the plurality of clients when said at least one condition is satisfied;

upon an occurrence of a rule-triggering event, determining at the server whether the condition is satisfied; and if said at least one condition is satisfied, (i) identifying, by the server, any actions defined by said rule that can be performed by the server and performing the identified actions at the server; and (ii) generating a deferred action message, that is processed one of the plurality of clients when a user accesses the server, representative of the at least one action if one or more of the resources for performing the action are resident on one of the plurality of clients, the deferred action message including a field that identifies a unique messaging environment on one of the plurality of clients and a pointer to the message whose delivery precipitated the deferred action message.

17. The method of claim 16 further comprising:

when one of the plurality of clients logs in to the server, comparing the field of the deferred action message with the unique messaging environment of the client; and processing the deferred action message by the client if the field of the deferred action message matches the unique messaging environment of the client.

18. The method of claim 17 further comprising performing the at least one action at the client based on the deferred action message.

19. The method of claim 17 further comprising:

if the field of the deferred action message does not match the unique messaging environment of the client, determining an age of the deferred action message; and performing a predetermined operation if the age of the deferred action message exceeds a threshold value.

20. The method of claim 19 in which the threshold value is in a range of about 30–90 days.

21. The method of claim 19 in which the threshold value is about 60 days.

22. The method of claim 19 in which the predetermined operation comprises deleting the deferred action message.

23. The method of claim 19 in which the predetermined operation comprises disabling the rule.

24. The method of claim 16 in which the unique messaging environment of the client comprises a rule provider.

25. The method of claim 16 in which the unique messaging environment of the client comprises a messaging application programming interface profile.

26. The method of claim 16 in which the rule includes a plurality of actions to be performed, a first subset of actions is performed at the server, and a second subset of actions is used as a basis for generating the deferred action message.

27. The method of claim 26 in which the deferred action message includes information to compensate for a change in characteristics caused by performing the first subset of actions at the server.

28. The method of claim 16 in which the field in the deferred action message that identifies a unique messaging environment is generated based on identifying information included in the rule.

29. The method of claim 28 in which the identifying information included in the rule comprises a global unique identifier.

30. A messaging system comprising:

a server;

a mailbox resident on said server, the mailbox belonging to a user;

a plurality of clients connected to the server, each client offering a unique messaging environment for the user;

a rule specifying at least one condition and at least one action that is to be performed when said at least one condition is satisfied, said rule being stored on the server in association with the mailbox, the rule previously having been created by the user under one of the unique messaging environments for the plurality of clients;

said server comprising means for creating, in response to delivery of a message, a deferred action message comprising (i) a field identifying the unique messaging environment under which the rule was created; (ii) at least one action that is to be performed by one of the clients when a user accesses the server; and (iii) a pointer to the message whose delivery precipitated the deferred action message.

31. The messaging system of claim 30 in which the rule specifies a plurality of actions, at least one of which is to be performed by the server and at least one other of which is to be performed by the client.

32. The messaging system of claim 31 in which the pointer to the message is modified when one or more of the plurality of actions are performed at the server.

33. The messaging system of claim 30 in which the deferred action message includes its date of creation.

34. The messaging system of claim 33 in which any deferred action messages older than a predetermined age are deleted.

35. The messaging system of claim 33 in which any rules for which a deferred action message older than a predetermined age exists are disabled.

36. A computer program product, for use in a messaging system comprising a server and a plurality of clients, each of which have a unique messaging environment, and where a mailbox of a user resides on the server computer and is accessed by the user through one of the plurality of clients, comprising:

a computer readable medium having computer executable instructions embodied thereon comprising:

means for defining, by the user, a rule having at least one condition that must be satisfied and at least one action that is to be performed by at least one of the clients when said at least one condition is satisfied;

means for determining whether said at least one condition specified in said rule has been satisfied;

means for identifying, by the server, any actions by said rule that can be performed by the server and means for performing, by the server, the identified actions;

means for creating, by the server, a deferred action message comprising said at least one action of said rule;

means for processing, by one of the clients, said deferred action message when the user is connected to said server through said one of the clients.

37. The computer program product of claim 36 in which the deferred action message includes a field that identifies the unique messaging environment of one of the plurality of clients, and further comprising:

means for determining whether the unique messaging environment of a client on which the user is logged in to the sever matches the field in the deferred action message; and means for processing the deferred action message by the client if its unique messaging environment matches the field in the deferred action message.

38. The computer program product of claim 37 further comprising means for deleting the deferred action message if it is older than a predetermined age.

39. The computer program product of claim 37 further comprising means for disabling the rule if a deferred action message older than a predetermined age exists.

* * * * *

UNITED STATES PATENT AND TRADEMARK OFFICE
CERTIFICATE OF CORRECTION

PATENT NO. : 5,978,566
DATED : November 2, 1999
INVENTOR(S) : Darrell Alan Plank, et. al.

It is certified that error appears in the above-identified patent and that said Letters Patent is hereby corrected as shown below:

Title page, item [75], inventors: change "Belleville" to --Bellevue--

Col. 4, ln. 30: after "evaluation of" and before "next" insert --the--

Col. 6, ln. 7: after "message to be" change "move" to --moved--

Col. 6, ln. 7: after "move or" change "copy" to --copied--

Col. 9, ln. 55: after "helps" change "prevents" to --prevent--

Col. 10, ln. 20: after "meaning that" change "that" to --the--

Col. 12, ln. 40: after "server and at" insert --least--

Signed and Sealed this

Twenty-sixth Day of December, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,978,566 Page 1 of 1
APPLICATION NO. : 08/679129
DATED : November 2, 1999
INVENTOR(S) : Darrell Alan Plank, Ramesh Babu Pabbati and R. Scott Briggs It is certified that error appears in the above-identified patent and that said Letters Patent is hereby corrected as shown below:

Column 11, line 29, delete "specifics" and insert --specifies--.

Signed and Sealed this

Seventh Day of October, 2008

JON W. DUDAS
*Director of the United States Patent and Trademark Office*